(12) United States Patent
Fujimaki et al.

(10) Patent No.: US 9,740,009 B2
(45) Date of Patent: Aug. 22, 2017

(54) HEAD MOUNTED DISPLAY AND METHOD FOR CONTROLLING HEAD MOUNTED DISPLAY

(71) Applicant: SEIKO EPSON CORPORATION, Tokyo (JP)

(72) Inventors: Yutaka Fujimaki, Matsumoto-Shi (JP); Toshikazu Uchiyama, Chino-Shi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 171 days.

(21) Appl. No.: 14/451,710

(22) Filed: Aug. 5, 2014

(65) Prior Publication Data
US 2015/0049003 A1 Feb. 19, 2015

(30) Foreign Application Priority Data

Aug. 19, 2013 (JP) ................................. 2013-169737

(51) Int. Cl.
*G02B 27/01* (2006.01)

(52) U.S. Cl.
CPC ....... *G02B 27/0172* (2013.01); *G02B 27/017* (2013.01); *G02B 2027/014* (2013.01);
(Continued)

(58) Field of Classification Search
CPC ............. G02B 27/0172; G02B 27/017; G02B 2027/014; G02B 2027/0138; G02B 2027/0118
(Continued)

(56) References Cited

U.S. PATENT DOCUMENTS

2010/0177114 A1* 7/2010 Nakashima .......... G02B 27/017
345/589
2013/0063486 A1* 3/2013 Braun .................... G09G 3/002
345/633
(Continued)

FOREIGN PATENT DOCUMENTS

JP   A-2008-92481      4/2008
JP   2008-242134 A    10/2008
(Continued)

OTHER PUBLICATIONS

"Uncomfortable glare in an indoor environment," Toshiba Lighting & Technology Corporation, www.tlt.co.jp/tlt/lighting_design/design/basic/data/26_35.pdf, internet search dated Jul. 9, 2013.
(Continued)

*Primary Examiner* — Amare Mengistu
*Assistant Examiner* — Gloryvid Figueroa-Gibson
(74) *Attorney, Agent, or Firm* — Oliff PLC

(57) ABSTRACT

A head mounted display includes an image display unit having an image light generation unit that generates image light based on image data and outputs the image light, the image display unit not only allowing a user who wears the image display unit around user's head to recognize the image light in the form of a virtual image but also transmitting a surrounding scene, and a control unit that compares an index set based not only on luminance of initial image light generated based on initial image data that is original image data but also on illuminance of the transmitted surrounding scene with a first threshold set in advance and causes the image light generation unit to generate display image light that differs from the initial image light in that at least part of the luminance thereof is changed based on a result of the comparison.

14 Claims, 8 Drawing Sheets

(52) U.S. Cl.
CPC ............... *G02B 2027/0118* (2013.01); *G02B 2027/0138* (2013.01)

(58) Field of Classification Search
USPC ........................................................... 345/8
See application file for complete search history.

(56) References Cited

U.S. PATENT DOCUMENTS

| | | | | |
|---|---|---|---|---|
| 2013/0127980 | A1* | 5/2013 | Haddick | G06F 3/013 |
| | | | | 348/14.08 |
| 2013/0147859 | A1 | 6/2013 | Kobayashi | |
| 2015/0300816 | A1* | 10/2015 | Yang | G01B 11/2513 |
| | | | | 600/424 |
| 2015/0373806 | A1* | 12/2015 | Vissenberg | H04B 33/0872 |
| | | | | 315/151 |

FOREIGN PATENT DOCUMENTS

| | | |
|---|---|---|
| JP | A-2010-58631 | 3/2010 |
| JP | 2013-122519 A | 6/2013 |

OTHER PUBLICATIONS

"Evaluation of discomfort glare," Iwasaki Electric Co., Ltd., www.iwasaki.co.jp/info_lib/tech-data/knowledge/glare/02.html, internet search dated Jul. 9, 2013.

Kim et al., "Position Index for a Glare Source in the Whole Visual Field," *J. Illum. Engng. Inst. Jpn.*, 2004, vol. 88, No. 11, pp. 847-852 (with English abstract).

* cited by examiner

| UGR VALUE | SENSE OF GLARE |
|---|---|
| 28 | JUST INTOLERABLE |
| 25 | UNCOMFORTABLE BUT NOT INTOLERABLE |
| 22 | JUST UNCOMFORTABLE |
| 19 | UNACCEPTABLE BUT NOT UNCOMFORTABLE |
| 16 | JUST UNACCEPTABLE |
| 13 | PERCEPTIBLE BUT UNACCEPTABLE |

HEAD MOUNTED DISPLAY AND METHOD FOR CONTROLLING HEAD MOUNTED DISPLAY

BACKGROUND

1. Technical Field

The present invention relates to a head mounted display.

2. Related Art

There is a known head mounted display (HMD), which is a display worn around user's head for use. A head mounted display, for example, generates image light representing an image by using a liquid crystal display and a light source and guides the generated image light to user's eyes by using a projection system and a light guide plate to allow the user to recognize a virtual image. Further, uncomfortable dazzle and other types of psychological discomfort resulting from a high-luminance object are known to be expressed by discomfort glare, and there are a plurality of known discomfort glare evaluation methods for numerically representing discomfort glare.

JP-A-2008-92481 discloses a dazzle evaluation image and image display. The dazzle evaluation image contains a white rectangular image (white rectangle) against a black background, and the proportion of the area of the white rectangle to the area of the entire evaluation image and the luminance of the white rectangle are changed to identify a threshold that is derived from the relationship between the proportion of the area of the white rectangle and the luminance thereof and corresponds to dazzle that causes the user who recognizes the evaluation image to feel discomfort. The image display compares a display image actually recognized by the user with the threshold to adjust the luminance of the display image. JP-A-2010-58631 discloses a head mounted display that captures an image of a surrounding scene. When the image of the surrounding scene contains a high-luminance object, the head mounted display adjusts the transparency of the surrounding scene recognized by a user to smoothen the illuminance of the transmitted surrounding scene for reduction in discomfort glare.

The image display described in JP-A-2008-92481, however, simply considers the luminance of only an image displayed by the image display but does not consider the illuminance of a surrounding scene recognized by the user and hence has room to reduce discomfort resulting from dazzle that the user feels. The head mounted display described in JP-A-2010-58631 adjusts only the illuminance of the transmitted surrounding scene recognized by the user but it is desired to make the adjustment in consideration of the luminance of image light that the head mounted display allows the user to recognize, in other words, based on the illuminance of the surrounding scene and the luminance of the image light recognized by the user. It is further desired to not only control the illuminance of a surrounding scene and the luminance of an image recognized by the user but also increase visibility of image light recognized by the user.

The following non-patent documents are exemplified as other related art documents: "Discomfort glare in indoor environment," [online], [searched on Jul. 9, 2013], Internet <http://www.tlt.co.jp/tlt/lighting_design/design/basic/data/26_35.pdf>; IWASAKI ELECTRIC CO., LTD., "Evaluation of discomfort glare," [online], [searched on Jul. 9, 2013], Internet <http://www.iwasaki.co.jp/info_lib/tech-data/knowledge/glare/02.html>; and KIM Wonwoo, other two, "Position Index for a Glare Source in the Whole Visual Field," Journal of Light & Visual Environment, The Illuminating Engineering institute of Japan (general incorporated association), Vol. 83 (2004) No. 11, pp. 847-852.

SUMMARY

An advantage of some aspects of the invention is to solve at least a part of the problems described above, and the invention can be implemented as the following forms.

(1) An aspect of the invention provides a head mounted display. The head mounted display includes an image display unit having an image light generation unit that generates image light based on image data and outputs the image light, the image display unit not only allowing a user who wears the image display unit around user's head to recognize the image light in the form of a virtual image but also transmitting a surrounding scene; and a control unit that compares an index set based not only on luminance of initial image light generated based on initial image data that is original image data but also on illuminance of the transmitted surrounding scene with a first threshold set in advance and causes the image light generation unit to generate display image light that differs from the initial image light in that at least part of the luminance thereof is changed based on a result of the comparison. According to the thus configured head mounted display, the index calculated based on the luminance of the image light generated by the image display unit and the illuminance of the surrounding scene transmitted through the image display unit and recognized by the user is used to change the luminance of the image light, whereby dazzle that the user feels uncomfortable can be suppressed. Further, since the luminance of the image light is changed in accordance with the index, fatigue of user's eyes can be lowered.

(2) The head mounted display according to the aspect described above may further include an illuminance detecting section that detects the illuminance of the surrounding scene, and the index may be set based on the luminance of the initial image light and the detected illuminance of the surrounding scene. According to the thus configured head mounted display, the index is calculated in accordance with a change in the illuminance of the surrounding scene and the luminance of the image light generated by the image display unit is controlled in accordance with the index, whereby user's sense of dazzle can be suppressed by a greater amount, and the fatigue of user's eyes can be lowered by a greater amount.

(3) in the head mounted display according to the aspect described above, the index may increase as the luminance of the initial image light increases but decrease as the illuminance of the transmitted surrounding scene increases, and when the comparison result shows that the index is greater than or equal to the first threshold, the control unit may cause the image light generation unit to generate the display image light that differs from the initial image light in that at least part of the luminance thereof is reduced. The thus configured head mounted display, which uses the index numerically representing discomfort glare, which represents uncomfortable dazzle and other types of psychological discomfort resulting from a high-luminance object, can therefore suppress user's sense of dazzle and lower the fatigue of user's eyes simply by performing luminance control in which the luminance of the image light generated by the image display unit is lowered.

(4) In the head mounted display according to the aspect described above, the index may change by a greater amount in accordance with a change in luminance in a position close to the center of a region of the image light generation unit where the image light is outputted than in accordance with a change in luminance in a position far away from the center of the region, and the display image light may be the image light that differs from the initial image light in that the amount of decrease in luminance in the position close to the center of the region is greater than the amount of decrease in luminance in the position far away from the center of the region. According to the thus configured head mounted display, in which the luminance values at pixels that greatly contribute to a decrease in the index are preferentially reduced, a decrease in the overall luminance of the image light generated by the image display unit is suppressed so that a decrease in the visibility of the image light recognized by the user is suppressed, and not only can user's sense of dazzle be suppressed but also the fatigue of user's eyes can be lowered.

(5) The head mounted display according to the aspect described above may further include a viewing range identifying section that identifies user's viewing range; the index may change by a greater amount in accordance with a change in luminance in a position close to the center of the identified user's viewing range than in accordance with a change in luminance in a position far away from the center of the viewing range; and the display image light may be the image light that differs from the initial image light in that the amount of decrease in luminance in the position close to the center of the viewing range is greater than the amount of decrease in luminance in the position far away from the center of the viewing range. According to the thus configured head mounted display, in which the luminance values at pixels that greatly contribute to a decrease in the index are preferentially reduced, a decrease in the overall luminance of the image light generated by the image display unit is suppressed so that a decrease in the visibility of the image light recognized by the user is suppressed, and not only can user's sense of dazzle be suppressed but also the fatigue of user's eyes can be lowered.

(6) In the head mounted display according to the aspect described above, the index may increase as the luminance of the initial image light increases but decrease as the luminance of the surrounding scene increases, and when the comparison result shows that the index is smaller than the first threshold, the control unit may cause the image light generation unit to generate the display image light that differs from the image light in that at least part of the luminance thereof is increased to the extent that the index does not become greater than or equal to the first threshold. According to the thus configured head mounted display, when the user feels no discomfort in the image light before the luminance thereof is controlled, the user is allowed to recognize the image light having the increased luminance values, whereby user's sense of dazzle can be suppressed and the visibility of the image light before the luminance thereof is controlled can be improved.

(7) The head mounted display according to the aspect described above may further include a surrounding scene illuminance adjusting section that adjusts the illuminance of the transmitted surrounding scene with respect to the illuminance of the surrounding scene and transmits the image light; the index may increase as the luminance of the initial image light increases but decrease as the illuminance of the surrounding scene increases; and when the comparison result shows that the index is smaller than the first threshold, the control unit may adjust the surrounding scene illuminance adjusting section in such a way that at least part of the illuminance of the transmitted surrounding scene decreases to the extent that the index does not become greater than or equal to the first threshold. According to the thus configured head mounted display, in which the luminance of the image light does not need to be increased to improve the visibility of the image light recognized by the user, the visibility of the image light recognized by the user can be improved without consumption of unnecessary electric power.

(8) The head mounted display according to the aspect described above may further include a surrounding scene illuminance adjusting section that adjusts the illuminance of the transmitted surrounding scene with respect to the illuminance of the surrounding scene and transmits the image light; the index may increase as the luminance of the initial image light increases but decrease as the illuminance of the surrounding scene increases; and when the comparison result shows that the index is smaller than the first threshold, the control unit may cause the image light to contain information on adjustment of the illuminance of the transmitted surrounding scene made by the surrounding scene illuminance adjusting section as the image light to be recognized by the user. According to the thus configured head mounted display, since luminance control in which discomfort glare, which represents uncomfortable dazzle and other types of psychological discomfort resulting from a high-luminance object, is reduced is performed, the control of the image display unit other than the increase or decrease in the luminance of the image light is intentionally performed by the user, whereby the convenience of the user is improved.

(9) In the head mounted display according to the aspect described above, the index may increase as the luminance of the initial image light increases but decrease as the illuminance of the surrounding scene increases, and when the comparison result shows that the index is greater than or equal to the first threshold, the control unit may cause the image light to contain information on control of the image light as the image light to be recognized by the user. According to the thus configured head mounted display, since luminance control in which discomfort glare, which represents uncomfortable dazzle and other types of psychological discomfort resulting from a high-luminance object, is reduced is performed, the control of the image display unit other than the increase or decrease in the luminance of the image light is intentionally performed by the user, whereby the convenience of the user is improved.

(10) In the head mounted display according to the aspect described above, the control unit may cause the image light generation unit to generate the display image light based not only on a generation period for which the image light generation unit generates the image light but also on the index over the generation period. According to the thus configured head mounted display, the image light is controlled in consideration of the temporal transition of the index, whereby the dazzle that the user feels uncomfortable can be suppressed, and accumulation of user's fatigue with elapsed time can be suppressed.

(11) In the head mounted display according to the aspect described above, the index may increase as the luminance of the initial image light increases but decrease as the illuminance of the surrounding scene increases, and when an accumulation of the index for the generation period is greater than or equal to a second threshold set in advance, the control unit may cause the image light to contain information on control of the image light as the image light to be recognized by the user. The thus configured head mounted display can notify the user of user's fatigue due to continuous use of the head mounted display in realtime and hence the convenience of the user can be improved.

All the plurality of components in the aspects of the invention described above are not essential, and part of the plurality of components can be changed, omitted, replaced with new other components as appropriate, and part of the limiting conditions can be omitted as appropriate in order to achieve part or entirety of the advantageous effects described in the present specification. Further, to achieve part or entirety of the advantageous effects described in the present specification, part or entirety of the technical features contained in any one of the aspects of the invention described above can be combined with part or entirety of the technical features contained in another one of the aspects of the invention described above to form an independent aspect of the invention.

For example, an aspect of the invention can be implemented as an apparatus including one or both of the following two elements: the image display unit; and the control unit. That is, the apparatus may or may not include the image display unit. Further, the apparatus may or may not include the control unit. The image display unit, for example, may include the image light generation unit that generates image light based on image data and outputs the image light and may not only allow a user who wears the image display unit around user's head to recognize the image light in the form of a virtual image but also transmit a surrounding scene. The control unit, for example, may compare an index set based not only on the luminance of initial image light generated based on initial image data that is original image data but also on the illuminance of the transmitted surrounding scene with a first threshold set in advance, cause the image light generation unit to generate display image light that differs from the initial image light in that at least part of the luminance thereof is changed based on a result of the comparison, and set the display image light as the image light that the image display unit allows the user to recognize. The apparatus described above can, for example, be implemented as a head mounted display and can also be implemented as another type of apparatus that is not a head mounted display. According to the aspect described above, at least one of the variety of following challenges can be achieved: improvement in operability of the apparatus and simplification of the apparatus; integration of the apparatus; and improvement in convenience of the user who uses the apparatus. Part or entirety of the technical features of the aspects of the head mounted display described above is applicable to the another type of apparatus.

The invention can be implemented in a variety of aspects in addition to a head mounted display. For example, a method for controlling the head mounted display, a head mounted display system, a computer program for implementing the functions of the head mounted display system, a recording medium on which the computer program is recorded, and a data signal containing the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Implementation of the invention will next be described with reference to an embodiment in the following order.
A. Embodiment
A-1. Discomfort glare
A-2. Configuration of head mounted display
A-3. Luminance control
B. Variations A. Embodiment A-1. Discomfort Glare An event in which presence of a high-luminance object or any other situation causes a user to feel psychological discomfort is called discomfort glare, and there are a variety of known discomfort glare evaluation methods for numerically representing discomfort glare. One of the discomfort glare evaluation methods is use of UGR (unified glare rating) expressed by Expression (1), which indicates that the greater a calculated UGR value, the greater the discomfort that a user feels.

$$UGR = 8\log\left(\frac{0.25}{Lb}\sum\frac{L^2\omega}{P^2}\right) \quad (1)$$

Lb: luminance of background per unit area (cd/m$^2$)
L: luminance of light emitting portion in environment in question per unit area (cd/m$^2$)
ω: solid angle of light emitting portion (sr)
The solid angle ω is determined by Expression (2) containing Ap and r (m).

$$\omega = \frac{Ap}{r^2} \quad (2)$$

Ap: projected area of light emitting portion (m$^2$)
r: distance from eye of user to light emitting portion (m)
The value P (hereinafter also referred to as "position index PI") in Expression (1) is determined by horizontal and vertical displacements with respect to the direction of user's sight line.

Figure 1:
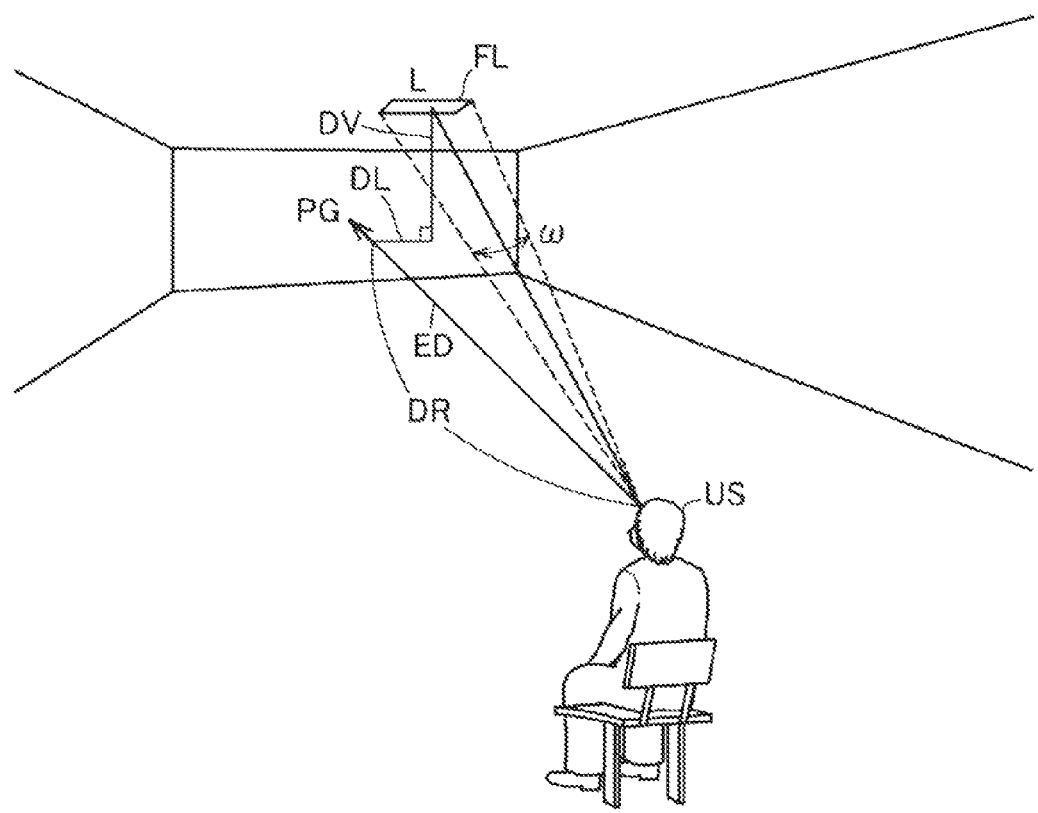
FIG. 1 is a descriptive diagram showing an example of the relationship between the direction of user's sight line and a light emitting portion.

FIG. 1 is a descriptive diagram showing an example of the relationship between the direction of the sight line of a user US and a light emitting portion. FIG. 1 shows a case where the user US looks at a point of fixation PG and the positional relationship between a sight line direction ED from the user US to the point of fixation PG and a fluorescent lamp FL as the light emitting portion disposed on a ceiling. The fluorescent lamp FL emits light of a luminance L. Now, let DR be the distance from the user US to a point on the sight line direction ED to which the center of the fluorescent lamp FL is perpendicularly projected. A horizontal displacement DL and a vertical displacement DV denote the horizontal and vertical displacements of the center of the fluorescent lamp FL with respect to the sight line direction ED, respectively. The symbol ω denotes the solid angle of the fluorescent lamp FL viewed from the user US.

Figures 2, 3:
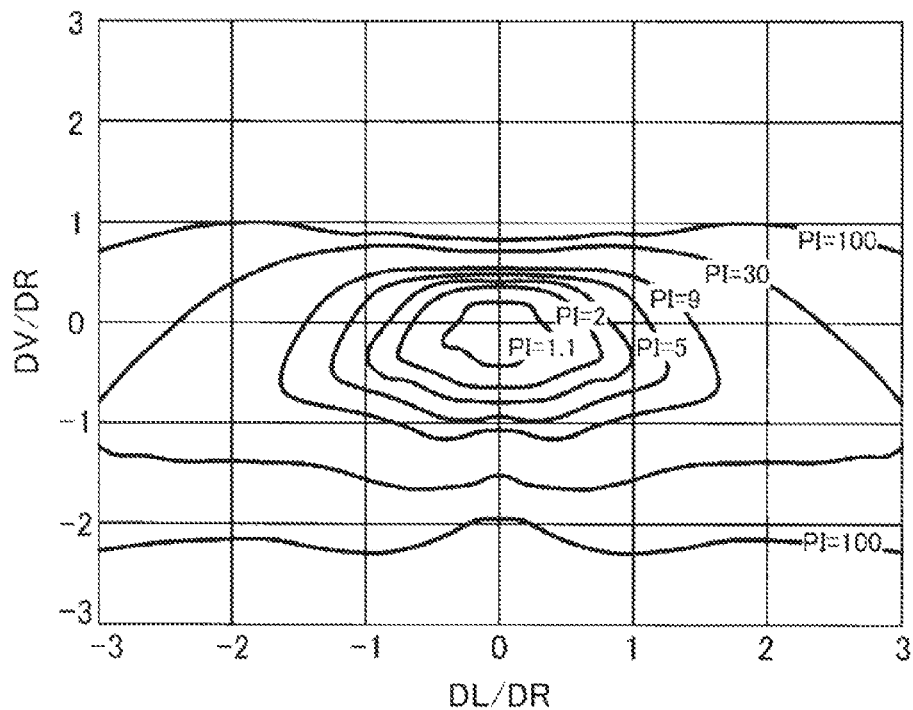
FIG. 2 is a descriptive diagram showing an example of a position index over an entire user's viewing range.
FIG. 3 is a descriptive diagram showing an example of the relationship between a UGR value and the sense of glare.

FIG. 2 is a descriptive diagram showing an example of the position index PI over an entire user's viewing range. FIG. 2 shows the position index PI in the case where the center of the light emitting portion is projected to the sight line direction ED with the horizontal axis representing the horizontal displacement DL divided by the distance DR and the vertical axis representing the vertical displacement DV divided by the distance DR. The signs of the horizontal displacement DL and the vertical displacement DV are defined as follows: A rightward horizontal displacement DL has a positive value; and an upward vertical displacement DV has a positive value. As an example of the position index PI, when DL/DR is 2 or −2 and DV/DR is 1, the position index PI is 100.

When the values of DL/DR and DV/DR are zero, that is, when the center of the light emitting portion is present on the sight line direction ED, the position index PI is minimized, as shown in FIG. 2. The smaller the position index PI, the greater the value of the UGR (hereinafter also referred to as "UGR value"), as indicated by Expression (1) described above, which means that the user feels discomfort. The position index PI increases as the values of DL/DR and DV/DR are separate from the center of the viewing range where the values of DL/DR and DV/DR are zero, as shown in FIG. 2. That is, the farther the center of the light emitting portion from the sight line direction ED, the greater the position index PI. Each of the curves representing the same value of the position index PI is an ellipse that horizontally spreads on opposite sides of the center.

FIG. 3 is a descriptive diagram showing an example of the relationship between the UGR value and the sense of glare. The sense of glare is a sensory value representing the discomfort glare perceived by the user in correspondence with the UGR value. It is known that the sense of glare, which results from user's sense, varies in accordance with race, ethnic groups, climate, lifestyle, and other factors. According to ISO 8995-2002, a UGR value of 13 is defined as a minimum where a user can perceive discomfort glare, and the sense of glare distinctively increases in human perception whenever the UGR value increases in increments of 3. A large UGR value can therefore be reduced by lowering luminance L of optical image display sections 26 and 28, which is the luminance of a display image displayed on an image display unit 20, whereby user's sense of glare can be suppressed. It is further known that a larger UGR value allows the user to more readily recognize a display image. Therefore, when the UGR value is small, increasing the UGR value allows improvement in visibility of a display image recognized by the user. Further, it is assumed that user's fatigue accumulates as the period for which the user perceives glare elapses even when the UGR value remains unchanged.

A-2. Configuration of Head Mounted Display

Figure 4:
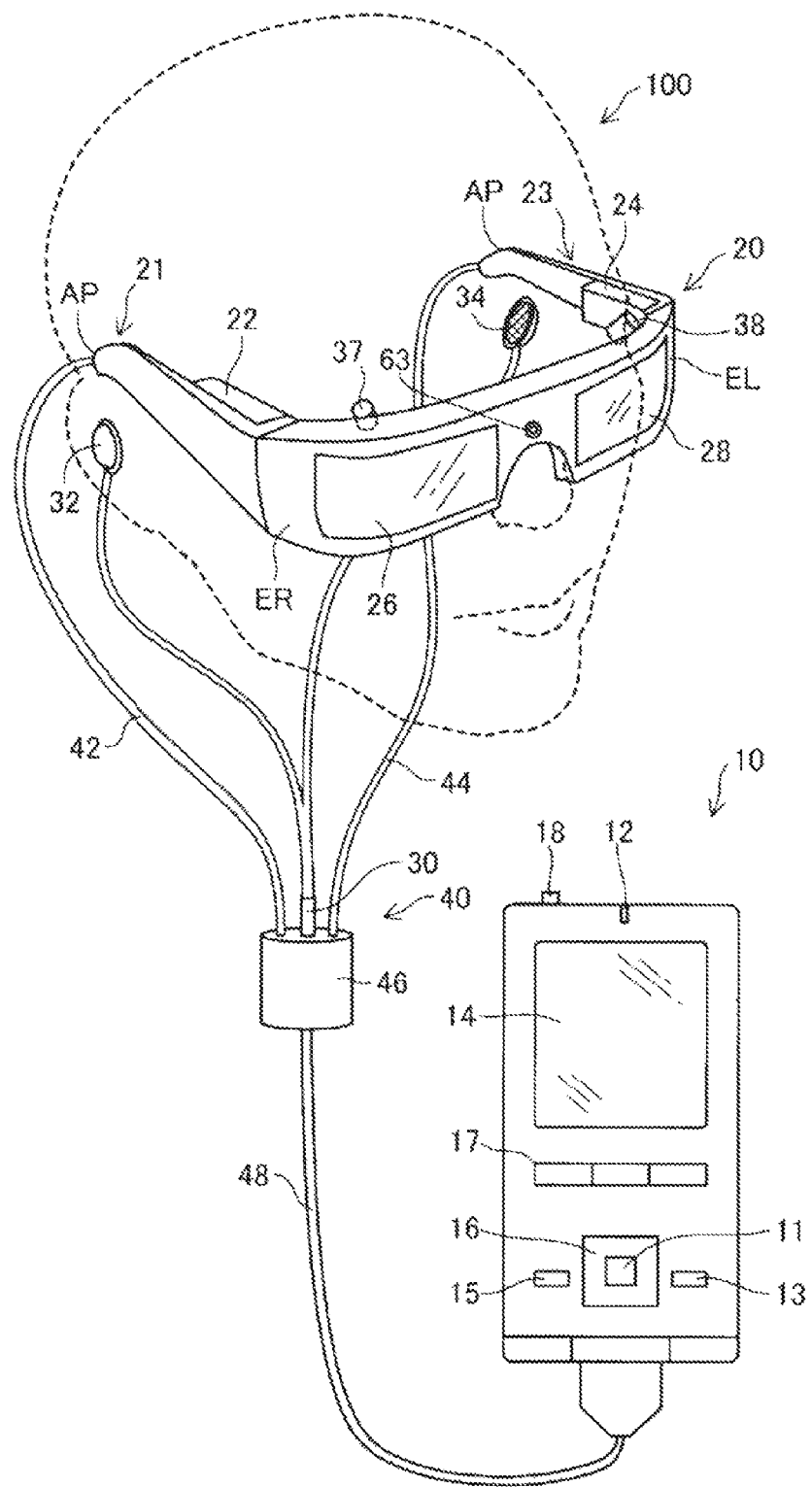
FIG. 4 is a descriptive diagram showing an exterior configuration of a head mounted display.

FIG. 4 is a descriptive diagram showing an exterior configuration of a head mounted display 100. The head mounted display 100 is a display worn around user's head and is also called an HMD. The head mounted display 100 according to the present embodiment is an optically transmissive head mounted display that allows the user to not only recognize a virtual image but also directly recognize a surrounding scene at the same time. In the present specification, a virtual image that the head mounted display 100 allows the user to recognize is called a "display image" for convenience. Further, outputting image light generated based on image data is also referred to as "displaying an image."

The head mounted display 100 includes an image display unit 20, which is worn around user's head and allows the user to recognize a virtual image, and a control unit 10 (controller 10), which controls the image display unit 20.

The image display unit 20 is a wearable member worn around user's head and has a spectacle-like shape in the present embodiment. The image display unit 20 includes a right holder 21, a right display driver 22, a left holder 23, a left display driver 24, a right optical image display section 26, a left optical image display section 28, an illuminance sensor 63, a right-eye imaging camera 37, and a left-eye imaging camera 38. The right optical image display section 26 and the left optical image display section 28 are so disposed that they are located in front of the right and left eyes of the user who wears the image display unit 20. One end of the right optical image display section 26 and one end of the left optical image display section 28 are connected to each other in a position corresponding to the portion between the eyes of the user who wears the image display unit 20.

The right holder 21 is a member extending from an end ER of the right optical image display section 26, which is the other end thereof, to a position corresponding to the right temporal region of the user who wears the image display unit 20. Similarly, the left holder 23 is a member extending from an end EL of the left optical image display section 28, which is the other end thereof, to a position corresponding to the left temporal region of the user who wears the image display unit 20. The right holder 21 and the left holder 23, which serve as temples (bows) of spectacles, hold the image display unit 20 around user's head.

The right display driver 22 and the left display driver 24 are disposed on opposite sides of the head of the user who wears the image display unit 20. In the following description, the right holder 21 and the left holder 23 are also simply called a "holder" in a collective manner. The right display driver 22 and the left display driver 24 are also simply called a "display driver" in a collective manner. The right optical image display section 26 and the left optical image display section 28 are also simply called an "optical image display section" in a collective manner.

The display drivers 22 and 24 include liquid crystal displays 241 and 242 (hereinafter also referred to as "LCDs 241 and 242"), projection systems 251 and 252, and other components (see FIG. 5). The configuration of the display drivers 22 and 24 will be described later in detail. The optical image display sections 26 and 28, each of which serves as an optical member, include light guide plates 261 and 262 (see FIG. 5) and light control plates 263 and 264 (see FIG. 5). The light guide plates 261 and 262 are made, for example, of a light transmissive resin material and guide image light outputted from the display drivers 22 and 24 to user's eyes. Each of the light control plates 263 and 264 is a thin-plate-shaped optical element capable of adjusting the optical density thereof based on a voltage applied thereto, and the light control plates 263 and 264 are so disposed that they cover the front side of the image display unit 20 that faces away from the side where user's eyes are present. Each of the light control plates 263 and 264 contains orientation particles that are oriented when a voltage is applied thereto by the control unit 10. The orientation particles allow continuously variable adjustment of the optical density of the light control plates 263 and 264 and hence the light transmittance thereof. The adjustment of the light transmittance of the light control plates 263 and 264 allows adjustment of the amount of external light incident on user's eyes and hence adjustment of visibility of a virtual image. The light control plates 263 and 264 also have a function of protecting the light guide plates 261 and 262 and preventing the light guide plates 261 and 262 from being damaged, dirt from adhering to the light guide plates 261 and 262, and other defects from occurring. The light control plates 263 and 264 correspond to the surrounding scene illuminance adjusting section in the appended claims.

The right-eye imaging camera 37 and the left-eye imaging camera 38 (hereinafter also referred to as "eye imaging cameras 37 and 38") are compact CCD cameras that capture images of user's right and left eyes. The illuminance sensor 63 detects the illuminance of a surrounding scene within a predetermined range. The surrounding scene is light that is reflected off an object (building, for example) within the predetermined range and can then be recognized by the user.

The image display unit 20 further includes a connection section 40 for connecting the image display unit 20 to the control unit 10. The connection section 40 includes a body cord 48, which is connected to the control unit 10, a right cord 42, a left cord 44, and a connection member 46. The right cord 42 and the left cord 44 are two cords into which the body cord 48 bifurcates. The right cord 42 is inserted into an enclosure of the right holder 21 through a lengthwise end portion AP of the right holder 21 and connected to the right display driver 22. Similarly, the left cord 44 is inserted into an enclosure of the left holder 23 through a lengthwise end portion AP of the left holder 23 and connected to the left display driver 24. The connection member 46 is disposed at the point where the body cord 48 bifurcates into the right cord 42 and the left cord 44 and has a jack for connecting an earphone plug 30. A right earphone 32 and a left earphone 34 extend from the earphone plug 30.

The image display unit 20 and the control unit 10 transmit a variety of signals to each other via the connection portion 40. A connector (not shown) is provided not only at the end of the body cord 48 that faces away from the side where the connection member 46 is present but also at an end of the control unit 10, and the connectors engage with each other. Causing the connectors at the body cord 48 and the control unit 10 to engage with each other and disengage from each other allows the control unit 10 and the image display unit 20 to be connected to each other and disconnected from each other. Each of the right cord 42, the left cord 44, and the body cord 48 can, for example, be a metal cable or an optical fiber.

The control unit 10 is an apparatus for controlling the head mounted display 100. The control unit 10 includes a finalizing key 11, a lighting portion 12, a display switch key 13, a track pad 14, a luminance switch key 15, a direction key 16, a menu key 17, and a power switch 18. The finalizing key 11 detects user's pressing operation and outputs a signal that finalizes an action corresponding to the operation performed through the control unit 10. The lighting portion 12 notifies the user of the action state of the head mounted display 100 in the form of the lighting state. An example of the action state of the head mounted display 100 is whether it is powered on or off. The lighting portion 12 is formed, for example, of an LED (light emitting diode). The display switch key 13 detects user's pressing operation and outputs a signal that switches, for example, content video image display mode between a 3D mode and a 2D mode. The track pad 14 detects operation performed by user's finger on an operation surface of the track pad 14 and outputs a signal according to a detection result. Examples of the track pad 14 may include a variety of types of track pad, such as an electrostatic type, a pressure detection type, and an optical type. The luminance switch key 15 detects user's pressing operation and outputs a signal that increases or decreases the luminance of an image displayed by the image display unit 20. The direction key 16 detects user's pressing operation performed on a portion corresponding to any of the upward, downward, rightward, and leftward directions and outputs a signal according to a detection result. The power switch 18 detects user's operation of sliding the switch and powers on or off the head mounted display 100.

Figure 5:
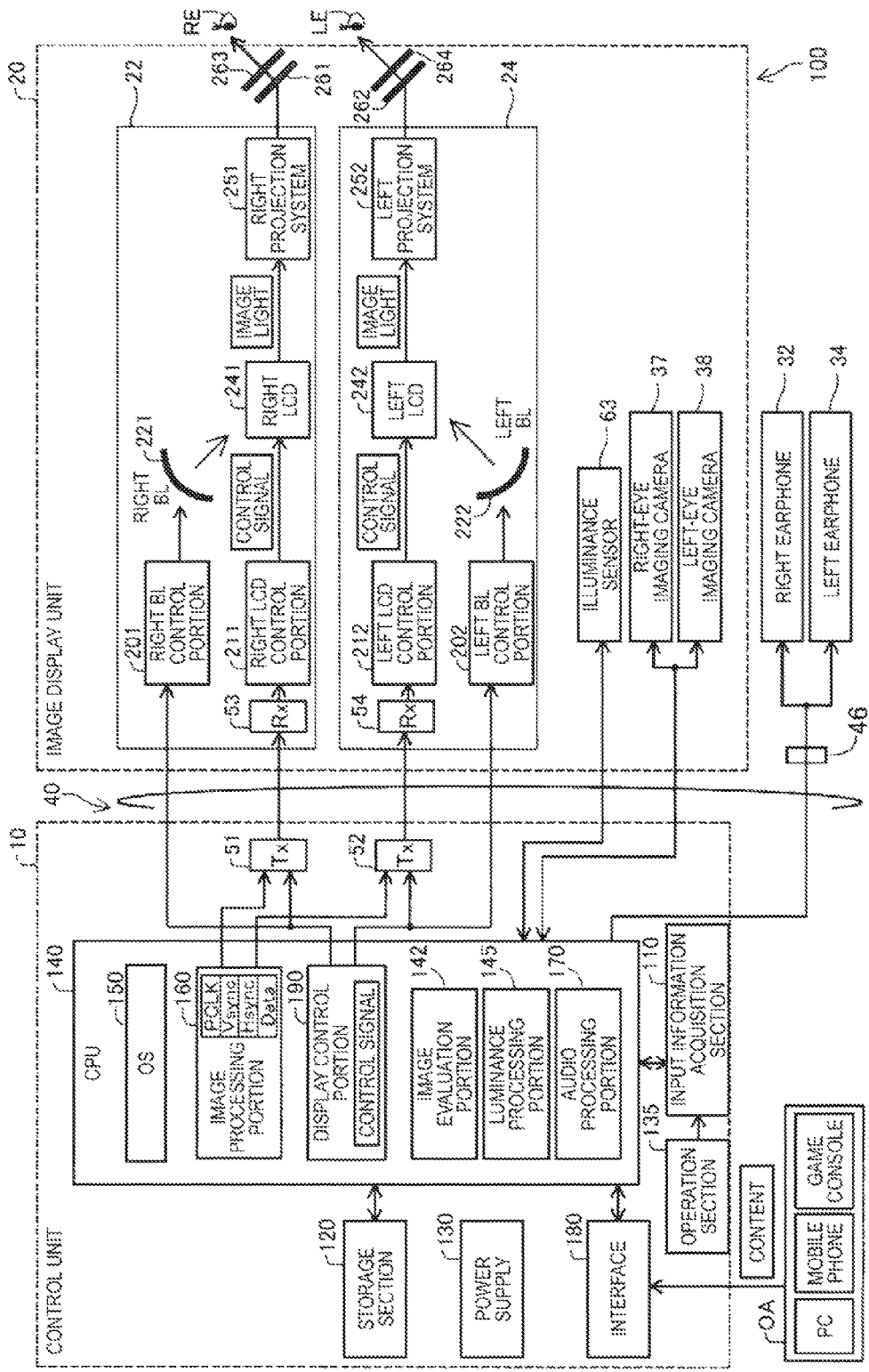
FIG. 5 is a block diagram showing a functional configuration of the head mounted display.

FIG. 5 is a block diagram showing a functional configuration of the head mounted display 100. The control unit 10 includes an input information acquisition section 110, a storage section 120, a power supply 130, an operation section 135, a CPU 140, an interface 180, a transmitter 51 (Tx 51), and a transmitter 52 (Tx 52), as shown in FIG. 5. The operation section 135 receives user's operation and is formed of the finalizing key 11, the display switch key 13, the track pad 14, the luminance switch key 15, the direction key 16, the menu key 17, and the power switch 18.

The input information acquisition section 110 acquires a signal according to a user's operation input. Examples of the signal according to a user's operation input include inputs in response to operation performed on the track pad 14, the direction key 16, and the power switch 18 disposed on the operation section 135. The power supply 130 supplies the components that form the head mounted display 100 with electric power. The power supply 130 can be formed, for example, of a secondary battery. The storage section 120 stores a variety of computer programs. The storage section 120 is formed, for example, of a ROM and a RAM. The CPU 140, which reads the computer programs stored in the storage section 120 and executes them, functions as an operating system 150 (OS 150), a display control portion 190, an audio processing portion 170, a luminance processing portion 145, an image evaluation portion 142, and an image processing portion 160.

The display control portion 190 produces control signals that control the right display driver 22 and the left display driver 24. Specifically, the display control portion 190 separately controls, with the aid of the control signals, for example, whether or not a right LCD control portion 211 drives the right LCD 241, whether or not a right backlight control portion 201 drives a right backlight 221, whether or not a left LCD control portion 212 drives the left LCD 242, and whether or not a left backlight control portion 202 drives a left backlight 222. The display control portion 190 thus causes each of the right display driver 22 and the left display driver 24 to generate and output image light. For example, the display control portion 190 causes both the right display driver 22 and the left display driver 24 to generate image light, only one of them to generate image light, or neither of them to generate image light.

The display control portion 190 transmits the control signals to the right LCD control portion 211 and the left LCD control portion 212 via the transmitters 51 and 52. The display control portion 190 further transmits the control signals to the right backlight control portion 201 and the left backlight control portion 202.

The luminance processing portion 145 calculates the UGR value based on the illuminance detected with the illuminance sensor 63 and the luminance of an image displayed by each of the optical image display sections 26 and 28. The luminance processing portion 145 divides the detected illuminance by a projection area to calculate the luminance of a surrounding scene. The luminance processing portion 145 further identifies, based on image data, the luminance of an image displayed on the image display unit 20. The luminance processing portion 145 further calculates the luminance of a background based on the calculated luminance of the surrounding scene and the luminance of the image. The luminance processing portion 145 compares the calculated UGR value with a preset reference to evaluate the UGR value. The image evaluation portion 142 analyzes a user's right eye image and a user's left eye image captured with the eye imaging cameras 37 and 38 to identify user's sight line direction ED. The illuminance sensor 63 and the luminance processing portion 145 correspond to the illuminance detecting section in the appended claims, and the eye imaging cameras 37 and 38 and the image evaluation portion 142 correspond to the viewing range identifying section in the appended claims. The image evaluation portion 142 corresponds to the control section in the appended claims.

The image processing portion 160 acquires an image signal contained in a content. The image processing portion 160 separates a vertical sync signal VSync, a horizontal sync signal HSync, and other sync signals from the acquired image signal. Further, the image processing portion 160 produces a clock signal PCLK, for example, by using a PLL (phase locked loop) circuit (not shown) in accordance with the cycles of the separated vertical sync signal VSync and horizontal sync signal HSync. The image processing portion 160 converts the analog image signal from which the sync signals are separated into a digital image signal, for example, by using an A/D conversion circuit (not shown). The image processing portion 160 then stores the converted digital image signal as image data (RGB data) on an image to be displayed in a DRAM in the storage section 120 on a frame basis. The image processing portion 160 may perform as required resolution conversion, luminance adjustment, chroma adjustment, and a variety of other types of color tone correction, and keystone correction, and other types of image processing on the image data.

The image processing portion 160 transmits the produced clock signal PCLK, the vertical sync signal VSync, the horizontal sync signal HSync, and the image data Data stored in the DRAM in the storage section 120 via the transmitters 51 and 52. The image data Data transmitted via the transmitter 51 is also called "image data for right eye," and the image data Data transmitted via the transmitter 52 is also called "image data for left eye." Each of the transmitters 51 and 52 functions as a transceiver for serial transmission between the control unit 10 and the image display unit 20.

The audio processing portion 170 acquires an audio signal contained in the content, amplifies the acquired audio signal, and supplies the amplified audio signal to a speaker (not shown) in the right earphone 32 and a speaker (not shown) in the left earphone 34, which are connected to the connection member 46. For example, when a Dolby (registered trademark) system is employed, relevant processing is performed on the audio signal, and the right earphone 32 and the left earphone 34 output sounds differentiated in terms, for example, of frequency.

The interface 180 connects a variety of external apparatus OA, which are content supply sources, to the control unit 10. Examples of the external apparatus OA may include a personal computer (PC), a mobile phone terminal, and a game console. The interface 180 can, for example, be a USB interface, a micro-USB interface, and a memory card interface.

The image display unit 20 includes the right display driver 22, the left display driver 24, the right light guide plate 261 as the right optical image display section 26, the left light guide plate 262 as the left optical image display section 28, a surrounding scene imaging camera 61, the illumination sensor 63, the right-eye imaging camera 37, and the left-eye imaging camera 38.

The right display driver 22 includes a receiver 53 (Rx 53), the right backlight controlling portion 201 (right BL controlling portion 201) and the right backlight 221 (right BL 221), which function as a light source, the right LCD control portion 211 and the right LCD 241, which function as a display device, and the right projection system 251. The right backlight control portion 201 and the right backlight 221 function as a light source. The right LCD control portion 211 and the right LCD 241 function as a display device. The right backlight control portion 201, the right LCD control portion 211, the right backlight 221, and the right LCD 241 are also collectively referred to as an "image light generation unit."

The receiver 53 functions as a receiver for serial transmission between the control unit 10 and the image display unit 20. The right backlight control portion 201 drives the right backlight 221 based on the inputted control signal. The right backlight 221 is, for example, an LED, an electroluminescence (EL) device, or any other light emitter. The right backlight control portion 201 controls drive operation of the right backlight 221 to control the luminance of the right backlight 221. Changing the luminance of the right backlight 221 allows different image signal to be generated even when the image data transmitted from the image processing portion 160 remains unchanged. The right LCD control portion 211 drives the right LCD 241 based on the clock signal PCLK, the vertical sync signal VSync, the horizontal sync signal HSync, and the image data for the right eye inputted via the receiver 53. The right LCD 241 is a transmissive liquid crystal panel having a plurality of pixels arranged in a matrix.

The right projection system 251 is formed of a collimator lens that converts the image light outputted from the right LCD 241 into a parallelized light flux. The right light guide plate 261 as the right optical image display section 26 reflects the image light having exited out of the right projection system 251 along a predetermined optical path and eventually guides the image light to user's right eye RE. The right projection system 251 and the right light guide plate 261 are also collectively referred to as a "light guide unit."

The left display driver 24 has the same configuration as that of the right display driver 22. The left display driver 24 includes a receiver 54 (Rx 54), the left backlight controlling portion 202 (left BL controlling portion 202) and the left backlight 222 (left BL 222), which function as a light source, the left LCD control portion 212 and the left LCD 242, which function as a display device, and the left projection system 252. The left backlight control portion 202 and the left backlight 222 function as a light source. The left LCD control portion 212 and the left LCD 242 function as a display device. The left backlight control portion 202, the left LCD control portion 212, the left backlight 222, and the left LCD 242 are also collectively referred to as an "image light generation unit." The left projection system 252 is formed of a collimator lens that converts the image light outputted from the left LCD 242 into a parallelized light flux. The left light guide plate 262 as the left optical image display section 28 reflects the image light having exited out of the left projection system 252 along a predetermined optical path and eventually guides the image light to user's left eye LE. The left projection system 252 and the left light guide plate 262 are also collectively referred to as a "light guide unit."

Figure 6:
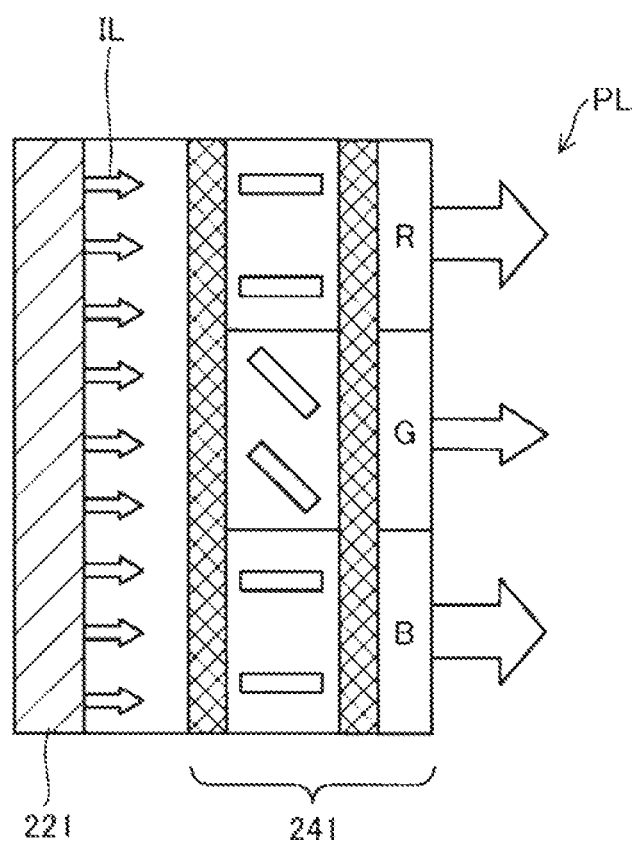
FIG. 6 is a descriptive diagram showing how an image light generation unit outputs image light.

FIG. 6 is a descriptive diagram showing how each of the image light generation units outputs image light. The right LCD 241 drives a liquid crystal material at each of the pixels arranged in a matrix to change the light transmittance of the right LCD 241 so that illumination light IL radiated from the right backlight 221 is modulated into effective image light PL representing an image. The same holds true for the left side. The backlight method is employed in the present embodiment as shown in FIG. 6, but a front light method or a reflection method may instead be employed to output image light.

A-3. Luminance Control

Figure 7:
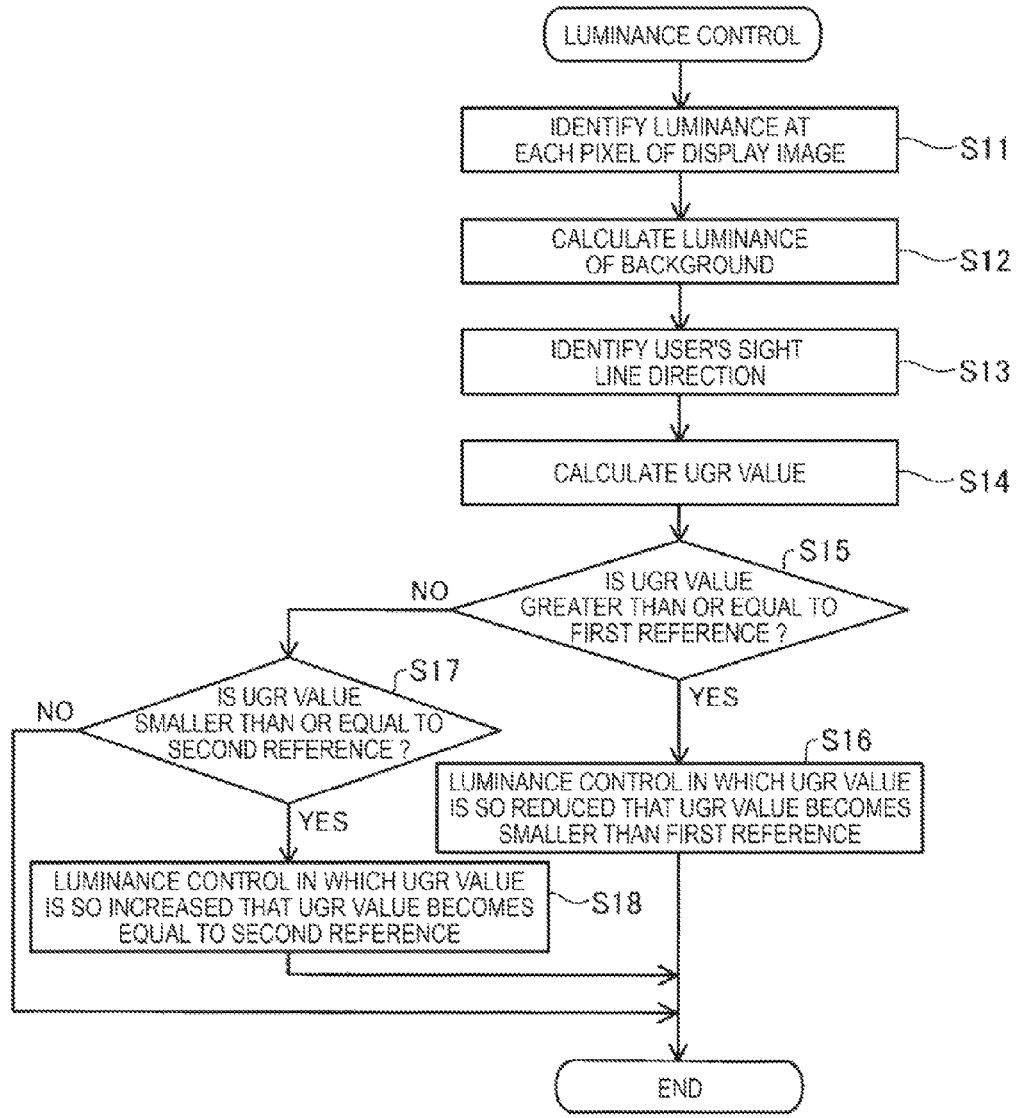
FIG. 7 is a descriptive diagram showing a procedure of luminance control.

FIG. 7 is a descriptive diagram showing the procedure of luminance control. In the luminance control, when the UGR value, which is calculated based on the luminance of a display image displayed by the image display unit 20 and the luminance of a background calculated from the illuminance of a surrounding scene and the luminance of the display image, is greater than or equal to a first reference, the luminance of the display image is so adjusted that the UGR value decreases, whereas when the UGR value is smaller than or equal to a second reference, the luminance of the display image is so adjusted that the UGR value increases.

FIG. 7 shows a procedure of the luminance control after the operation section 135 receives predetermined operation in a state in which an image is displayed on the image display unit 20. In the luminance control, the luminance processing portion 145 first identifies the luminance at each of the pixels that form the display image on the image display unit 20 (step S11). The luminance processing portion 145 then uses the illuminance sensor 63 to detect the illuminance of a surrounding scene, calculates the luminance of the surrounding scene by dividing the detected illuminance by a unit area, and calculates the luminance of a background based on the calculated luminance of the surrounding scene and the luminance at each of the pixels (step S12). The luminance of the background is calculated based not only on the luminance of the transmitted surrounding scene, that is, the luminance of the surrounding scene multiplied by the light transmittance of the light control plates 263 and 264 but also the luminance of the display image. In this case, since the region where the display image is displayed is smaller than the transmitted surrounding scene, the luminance of the background is calculated by adding average luminance over the display image to the luminance of the transmitted surrounding scene. The luminance processing portion 145 uses the average of the luminance values at the pixels as the average luminance over the display image.

The image evaluation portion 142 analyzes images of user's right and left eyes captured with the eye imaging cameras 37 and 38 to identify user's sight line direction ED (step S13). The luminance processing portion 145 then substitutes the luminance of the surrounding scene calculated from the illuminance of the surrounding scene, the luminance at each of the pixels that form the display image, and the sight line direction ED into Expression (1) described above to calculate the UGR value (step S14).

Figure 8:
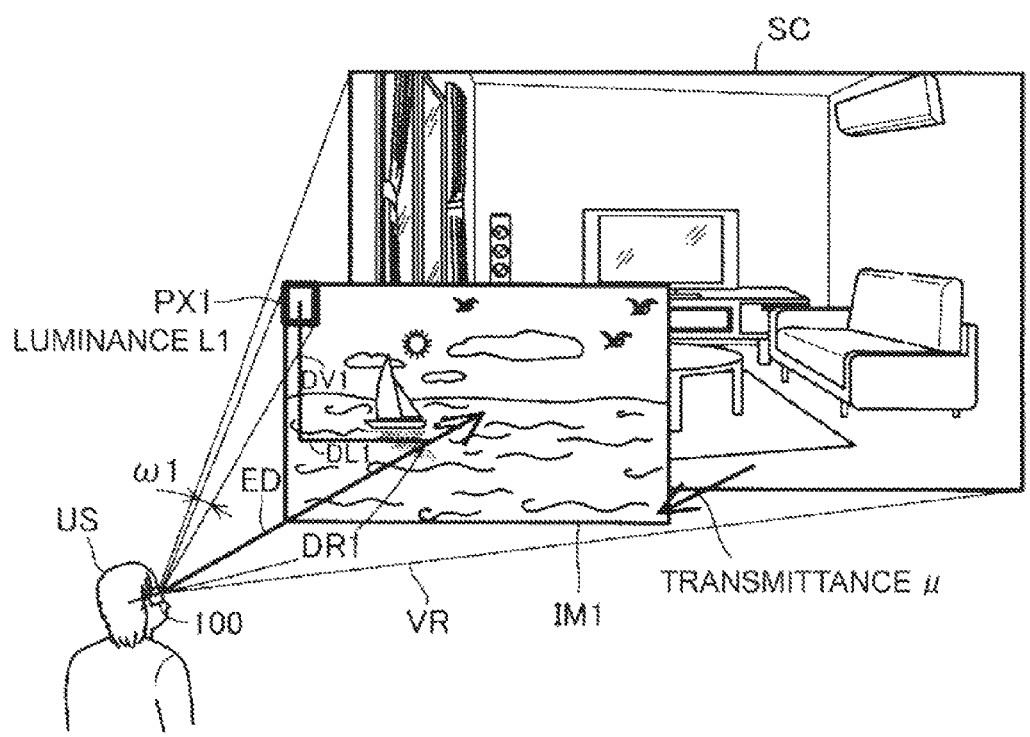
FIG. 8 is a descriptive diagram schematically showing a viewing range recognized by the user.

FIG. 8 is a descriptive diagram schematically showing a viewing range VR recognized by the user US. FIG. 8 shows a display image IM1 displayed on the image display unit 20 and a surrounding scene SC transmitted through the right and left optical image display sections 26 and 28 and recognized by the user. Since the head mounted display 100 is a transmissive head mounted display, the user US can recognize the surrounding scene SC superimposed on the display image IM1 and transmitted through the display image IM1. The display image IM1 is formed of a plurality of pixels. A pixel PX1 of the plurality of pixels has luminance L1 and a solid angle ω1 viewed from the user. The luminance L of the background is calculated by multiplying the calculated luminance of the surrounding scene SC by the light transmittance μ of the optical image display sections 26 and 28 and adding the average of the luminance values at the pixels to the resultant luminance.

Further, when the distance DR, which is the distance from the user US to a point on the sight line direction ED to which the pixel PX1 is perpendicularly projected, is DR1, the horizontal displacement DL is DL1 and the vertical displacement DV is DV1. The luminance processing portion 145 calculates DL1/DR1 and DV1/DR1 to determine the position index PI at the pixel PX1 by using the map of the position index PI (FIG. 2). Similarly, the luminance processing portion 145 determines the position index PI at each of the plurality of pixels that form the display image IM1. The luminance processing portion 145 substitutes the position indices PI obtained in the calculation described above into Expression (1) described above to calculate the UGR value.

After the UGR value is calculated (step S14 in FIG. 7), the luminance processing portion 145 evaluates whether or not the UGR value is greater than or equal to the preset first reference (step S15). In the present embodiment, the UGR value as the first reference is set at 19 (FIG. 3). When the evaluation result shows that the UGR value is greater than or equal to 19 (step S15 in FIG. 7: YES), the luminance processing portion 145 performs luminance control in which the luminance values at the pixels that display the display image IM1 are so reduced by the same amount that the UGR value becomes smaller than 19 (step S16). To this end, the luminance processing portion 145 calculates, based on Expression (1) described above, the amount of decrease by which the luminance values are lowered to make the UGR value smaller than 19. The luminance processing portion 145 controls the right backlight 221 and the left backlight 222 to change the luminance values that generate the display image, whereby a different display image is generated even when the same original image data is used. The luminance processing portion 145 causes the image display unit 20 to display a display image IM2 having luminance values obtained by subtracting the calculated amount of decrease from the original luminance values at the pixels. The control unit 10 then terminates the luminance control.

In the process in step S15, when the evaluation result shows that the UGR value is smaller than the first reference (step S15: NO), the luminance processing portion 145 evaluates whether or not the UGR value is smaller than or equal to the second reference, which is smaller than the first reference (step S17). In the present embodiment, the UGR value as the second reference is set at 13 (FIG. 3). When the evaluation result shows that the UGR value is greater than 13 (step S17 in FIG. 7: NO), the control unit 10 does not change the luminance values of the display image IM1 and terminates the luminance control with the display image IM1 displayed on the image display unit 20.

In the process in step S17, when the evaluation result shows that the UGR value is smaller than or equal to the second reference (step S17: YES), the luminance processing portion 145 performs luminance control in which the luminance values at the pixels are so increased by the same amount that the UGR value becomes equal to the second reference of 13 (step S18). The luminance processing portion 145 calculates the amount of increase in luminance based on Expression (1) described above and causes the image display unit 20 to display a display image IM3 having luminance values obtained by adding the same amount of increase to the original luminance values at the pixels. The control unit 10 then terminates the luminance control.

As described above, in the head mounted display 100 according to the present embodiment, the luminance processing portion 145 calculates the UGR value based on the detected illuminance and the luminance of the display image IM1 on the image display unit 20 and evaluates whether or not the calculated UGR value is greater than or equal to the preset first reference. When the evaluation result shows that the UGR value is greater than or equal to the first reference, the luminance processing portion 145 does not change the original image data based on which the display image IM1 is formed but causes the image display unit 20 to display the display image IM2 generated by changing only the luminance of the display image IM1. As a result, in the head mounted display 100 according to the present embodiment, the UGR value calculated based on the luminance of the display image on the image display unit 20 and the luminance of the surrounding scene SC transmitted through the optical image display sections 26 and 28 and recognized by the user is used to change the luminance of the display image, whereby dazzle that the user feels uncomfortable can be suppressed. Further, since the luminance of the display image is changed in accordance with the UGR value, fatigue of user's eyes can be lowered.

Further, in the head mounted display 100 according to the present embodiment, the illuminance sensor 63 detects the illuminance of the surrounding scene SC, and the UGR value is calculated based on the illuminance detected with the illuminance sensor 63 and the luminance of the display image IM1 on the image display unit 20. Therefore, in the head mounted display 100 according to the present embodiment, the UGR value is calculated in accordance with a change in the illuminance of the surrounding scene SC and the luminance of the display image on the image display unit 20 is controlled in accordance with the UGR value, whereby user's sense of dazzle can be suppressed by a greater amount, and the fatigue of user's eyes can be lowered by a greater amount.

Moreover, in the head mounted display 100 according to the present embodiment, in accordance with Expression (1) described above, the UGR value increases as the luminance L of a display image on the image display unit 20 increases. Further, since an increase in the illuminance of the surrounding scene SC results in an increase in the luminance Lb of the background, the UGR value is an index that decreases as the illuminance of the surrounding scene SC increases. When the UGR value is evaluated to be greater than or equal to the first reference, the luminance processing portion 145 causes the image display unit 20 to display the display image IM2 the luminance of which is lower than that of the display image IM1 on the image display unit 20. The head mounted display 100 according to the present embodiment, which uses the UGR value numerically representing discomfort glare, can therefore suppress user's sense of dazzle and lower the fatigue of user's eyes simply by performing luminance control in which the luminance of the display image on the image display unit 20 is lowered.

Further, in the head mounted display 100 according to the present embodiment, when the UGR value is evaluated to be smaller than or equal to the second reference, the luminance processing portion 145 performs luminance control in which the luminance values at the pixels are so increased by the same amount that the UGR value becomes equal to the second reference, calculates the amount of increase in luminance, and displays the display image IM3 having luminance values obtained by adding the amount of increase to the original luminance values at the pixels. Therefore, in the head mounted display 100 according to the present embodiment, when the user feels no discomfort in the display image IM1, the display image IM3 having the increased luminance values at the pixels is displayed on the image display unit 20, whereby user's sense of dazzle can be suppressed and the visibility of the display image IM can be improved.

Variations

The invention is not limited to the embodiment described above and can be implemented in a variety of aspects to the extent that they do not depart from the substance of the invention. For example, the following variations are conceivable:

B1. Variation 1

In the embodiment described above, the UGR expressed by Expression (1) described above is used as a discomfort glare evaluation method, but the discomfort glare evaluation method is not limited to the UGR-based method and a variety of variations are conceivable. For example, any one of VCP (visual comfort probability), BGI (British daylight glare index), and a luminance limiting method may be used, or a plurality of the methods described above may be used.

In the embodiment described above, the UGR value is compared with the first or second reference, and the luminance at each of the pixels that form the display image IM1 is increased or decreased by the same amount irrespective of the position of the pixel, but the amount of increase or decrease in the luminance at each of the pixels is not necessarily the same over the display image IM1, and a variety of variations are conceivable. For example, the position index PI increases with distance from the center of the viewing range, where DL/DR and DV/DR are zero, as shown in FIG. 2. That is, the position index PI increases with distance from the center of the light emitting portion to the sight line direction ED, and the UGR value decreases accordingly. Therefore, when the UGR value is evaluated to be greater than or equal to the first reference, the horizontal displacement DL and the vertical displacement DV with respect to the sight line direction ED are small, that is, the luminance processing portion 145 may reduce the UGR value by greatly lowering the luminance at each pixel close to the point of fixation PG. In this variation, in which the luminance at each pixel that greatly contributes to a decrease in the UGR value is preferentially lowered, a decrease in the overall luminance of the display image IM1 on the image display unit 20 is suppressed so that a decrease in the visibility of the display image recognized by the user is suppressed, but user's sense of dazzle can be suppressed and the fatigue of user's eyes can be lowered.

The UGR value may instead be reduced by setting the luminance values at some of the pixels that form the display image IM1 at zero. For example, the UGR value may be reduced by setting the luminance values at one-half the pixels that form the display image IM1 at zero in a staggered pattern to lower the overall luminance of the display image.

B2. Variation 2

In the embodiment described above, the eye imaging cameras 37 and 38 identify user's sight line direction ED, but the sight line direction ED is not necessarily identified, or the sight line direction ED may be identified based on another configuration. For example, the eye imaging cameras 37 and 38 may be replaced with a nine-axis sensor that is a motion sensor for detecting acceleration (three axes), angular velocity (three axes), and geomagnetism (three axes) and formed in the image display unit 20. The nine-axis sensor, which is formed in the image display unit 20, detects the motion of user's head around which the image display unit 20 is worn. The orientation of the image display unit 20 may be identified based on the detected motion of user's head, and the sight line direction ED may then be identified based on the orientation of the image display unit 20.

Further, even when user's sight line direction ED is not identified, the user typically looks forward in many cases. Therefore, after the UGR value is compared with the first or second reference, the luminance values at pixels close to the center of the region of the image display unit 20 where a display image can be formed may be increased or decreased by a greater amount than the luminance values at pixels remote from the center to increase or decrease the UGR value. In this variation, in which the luminance values at pixels that greatly contribute to a decrease in the UGR value are preferentially reduced, a decrease in the overall luminance of the display image IM1 on the image display unit 20 is suppressed so that a decrease in the visibility of the display image recognized by the user is suppressed, and not only can user's sense of dazzle be suppressed but also the fatigue of user's eyes can be lowered.

B3. Variation 3

In the embodiment described above, the luminance control is so performed that the luminance of the display image IM1 is increased or decreased based on the comparison of the UGR value with the first or second reference, but the luminance control based on the comparison between the UGR value and the reference is not limited to the increase or decrease in the luminance at each of the pixels, and a variety of variations are conceivable. For example, when the UGR value is evaluated to be greater than or equal to the first reference, the image processing portion 160 may display a message about the display image IM1, for example, "Do not use the display for a long period," as a display image recognized by the user. Further, a message about advance notice of control of the display image IM1, for example, "The brightness of the display image will be lowered in one minute," may be displayed, and then the luminance of the display image IM1 may be lowered. Further, in addition to the light control plates 263 and 264 built in the optical image display sections 26 and 28, a shade that can be intentionally removed by the user and changes the amount of the light representing the illuminance of the surrounding scene SC and transmitted through the shade may be provided on the surface of each of the optical image display sections 26 and 28, and a display image containing a message that prompts the user to remove the shades may be displayed. In this variation, since luminance control in which discomfort glare is reduced is performed other than the increase or decrease in the luminance of the display image IM1, the control of the image display unit 20 other than the increase or decrease in the luminance of the display image IM1 is intentionally performed by the user, whereby the convenience of the user is improved.

Further, the removable shades may be provided but the light control plate 263 or 264 may not be built in the optical image display section 26 or 28, or the shades may not be provided and the light control plate 263 or 264 may not be built in the optical image display section 26 or 28. Even when the light transmittance μ is not adjusted to control the luminance of the surrounding scene SC calculated from the illuminance of the surrounding scene SC, adjusting the luminance of a display image allows an increase or decrease in the UGR value, whereby user's sense of dazzle can be suppressed and the visibility of the display image IM1 can be improved.

A method for increasing the UGR value to improve the visibility of a display image recognized by the user is not limited to the control in which the luminance of the display image IM1 is increased, and a variety of variations are conceivable. For example, the light transmittance μ of each of the light control plates 263 and 264 provided in the optical image display sections 26 and 28 may be so adjusted that the illuminance of the surrounding scene SC and the luminance of the background recognized by the user are lowered for an increase in the UGR value. Further, not only may the adjustment of the light transmittance μ of each of the light control plates 263 and 264 be made but also the increase or decrease in the luminance at each of the pixels may be controlled. In this variation, in which the luminance of the display image IM1 does not need to be increased to improve the visibility of the display image recognized by the user, the visibility of the display image recognized by the user can be improved without consumption of unnecessary electric power.

B4. Variation 4

In the embodiment described above, the luminance of the display image IM1 is controlled based on the UGR value. The display image may instead be controlled based on the period for which the display image IM1 has been displayed and the UGR values over the display period. In the embodiment described above, when the UGR value is 16, the luminance of the display image IM1 is not controlled. However, in a case where a predetermined period has elapsed but the UGR value of 16 has not decreased, for example, a message about the display image IM1 or a message about advance notice of control of the display image IM1 may be displayed. Further, the average of the UGR values per unit time for which the display image IM1 is displayed may be calculated, and an accumulation of the average of the UGR values calculated over the display period may be compared with a third reference set in advance. When the accumulation is greater than or equal to the third reference, a message about control of the display image IM1 may be displayed. In this variation, since the display image IM1 is controlled based on the period for which the display image IM1 has been displayed and the UGR values over the display period, the display image IM1 is controlled in consideration of the temporal transition of the UGR value, whereby the dazzle that the user feels uncomfortable can be suppressed, and accumulation of user's fatigue with elapsed time can be suppressed. Further, in this variation, when the accumulation of the average UGR values over the display period is greater than or equal to the third reference, a message about control of the display image IM1 is displayed, whereby the head mounted display 100 can notify the user of user's fatigue due to continuous use of the head mounted display 100 in realtime and hence the convenience of the user can be improved.

B5. Variation 5

In the embodiment described above, the illumination sensor 63 detects the illuminance of the surrounding scene SC and the UGR value is calculated based on the detected illuminance, but the illuminance of the surrounding scene SC is not necessarily detected, and the calculation of the UGR value can be changed in a variety of manners. For example, when the operation section 135 may receive predetermined operation, the luminance of a background set in advance in correspondence with daytime and nighttime or indoor and outdoor environments may be used to calculate the UGR value.

Further, a plurality of illuminance sensors 63 may be provided in the image display unit 20, or the illuminance sensor 63 may be provided as a device separate from the image display unit 20. For example, the illuminance sensor 63 may separately detect the illuminance of a surrounding scene SC recognized by the right eye and the illuminance of a surrounding scene SC recognized by the left eye. In this variation, since luminance values calculated in correspondence with the right and left eyes can be controlled, and light transmittance μ at which the surrounding scene SC is transmitted can be controlled in correspondence with the right and left eyes, user's sense of dazzle can be suppressed by a greater amount, and the fatigue of user's eyes can be lowered by a greater amount.

Further, since the positional relationship between a light emitting source and the user and the relationship between the luminance of the light emitting source and a projected area allow the luminance and the illuminance to be related to each other, the illuminance may be calculated based on the luminance, or the luminance may be calculated based on the illuminance.

Further, in the embodiment described above, the average of the luminance values at the pixels of the display image IM1 is used as the average luminance of the overall display image IM1, but the average of the luminance values at the pixels is not necessarily used, and providing the average luminance of the overall display image IM1 can be changed in a variety of manners. For example, as in the case where the UGR value is calculated, the luminance at a pixel closer to the sight line direction ED may be weighted by a greater amount by using the position index PI, and then the average luminance of the overall display image IM1 may be calculated.

In the embodiment described above, the map of the position index PI shown in FIG. 2 is used, but the position index PI is not necessarily determined this way and the determination of the position index PI may be changed in a variety of manners. For example, the position index PI may be determined in a simplified manner based only on the distance from the sight line direction ED. Further, the UGR value may instead be calculated by using a single position index PI for a plurality of pixels around the center of the display image IM1 and using another single position index PI different from that for the central pixels for the other pixels.

In the embodiment described above, the operation section 135 is formed in the control unit 10, but the form of the operation section 135 can be changed in a variety of manners. For example, the operation section 135 may be provided as a user interface separately from the control unit 10. In this case, since the operation section 135 is separate from the control unit 10, in which the power supply 130 and other components are formed, the size of the operation section 135 can be reduced, whereby the user can operate the operation section 135 in an improved manner. Further, when a nine-axis sensor that detects the motion of the operation section 135 is formed in the operation section 135, and a variety of types of operation are performed based on the detected motion, the user can intuitively operate the head mounted display 100.

For example, each of the image light generation units may include an organic EL (organic electro-luminescence) display and an organic EL control portion. Further, each of the image light generation units may use an LCOS (liquid crystal on silicon) device (LCos is a registered trademark), a digital micromirror device, or any other device in place of the LCD. Moreover, for example, the invention is also applicable to a laser-retina-projection-type head mounted display. In a laser-retina-projection-type head mounted display, the "region of the image light generation unit where image light can be outputted" can be defined as an image region recognized by user's eye.

Further, for example, the head mounted display may employ an aspect in which the optical image display sections cover only part of user's eyes, in other words, an aspect in which the optical image display sections do not completely cover user's eyes. Further, the head mounted display may be what is called a monocular head mounted display. Moreover, the head mounted display is not limited to a light transmissive type and may be a light non-transmissive type which does not allows the user to recognize a surrounding scene SC in a see-through manner and a video transmissive type.

Figure 9A:
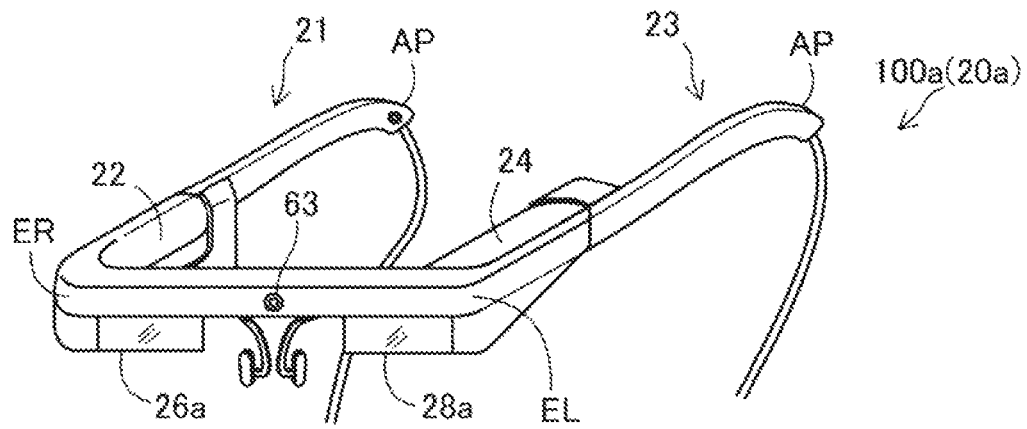
FIGS. 9A and 9B are descriptive diagrams each showing an exterior configuration of a head mounted display in a variation.
Figure 9B:
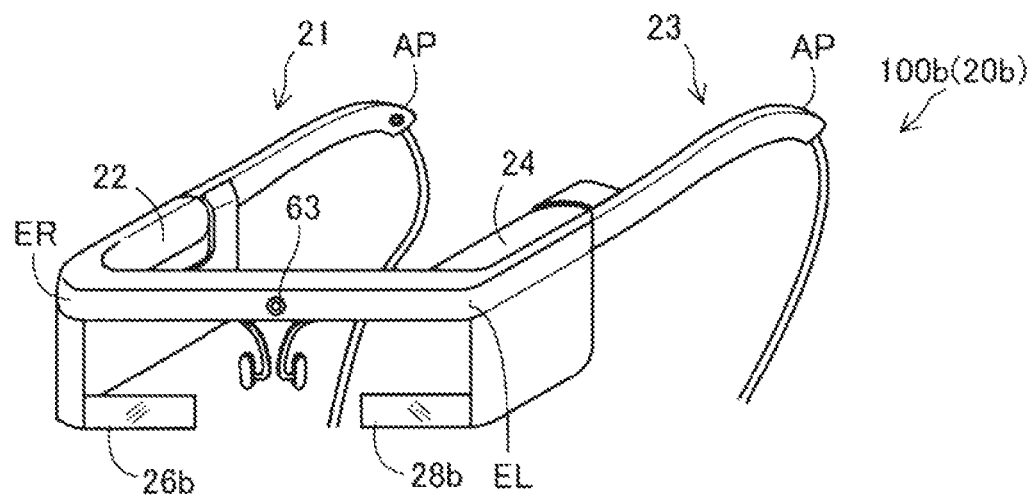

FIGS. 9A and 9B are descriptive diagrams each showing an exterior configuration of a head mounted display in a variation. A head mounted display 100a shown in FIG. 9A differs from the head mounted display 100 shown in FIG. 4 in that an image display unit 20a includes a right optical image display section 26a in place of the right optical image display section 26 and a left optical image display section 28a in place of the left optical image display section 28. The right optical image display section 26a is formed to be smaller than the optical member in the embodiment described above and disposed in a position obliquely upward with respect to the right eye of the user who wears the head mounted display 100a. Similarly, the left optical image display section 28a is formed to be smaller than the optical member in the embodiment described above and disposed in a position obliquely upward with respect to the left eye of the user who wears the head mounted display 100a. A head mounted display 100b shown in FIG. 9B differs from the head mounted display 100 shown in FIG. 4 in that an image display unit 20b includes a right optical image display section 26b in place of the right optical image display section 26 and a left optical image display section 28b in place of the left optical image display section 28. The right optical image display section 26b is formed to be smaller than the optical member in the embodiment described above and disposed in a position obliquely downward with respect to the right eye of the user who wears the head mounted display. The left optical image display section 28*b* is formed to be smaller than the optical member in the embodiment described above and disposed in a position obliquely downward with respect to the left eye of the user who wears the head mounted display. As described above, the optical image display sections only need to be disposed in positions in the vicinity of user's eyes. Further, the optical member that forms each of the optical image display sections can be arbitrarily sized, and the head mounted display 100 can employ a configuration in which the optical image display sections cover only part of user's eyes, in other words, a configuration in which the optical image display sections do not completely cover user's eyes.

Further, each of the earphones may be an ear-hooked type or a headband type or may even be omitted. Moreover, for example, the head mounted display may be configured to be incorporated in an automobile, an airplane, and other vehicles. Further, for example, the head mounted display may be configured to be built in a helmet or other body protection gears.

The configuration of the head mounted display 100 in the embodiment described above is presented only by way of example and can be changed in a variety of manners. For example, one of the direction key 16 and the track pad 14 provided on the control unit 10 may be omitted, or in addition to or in place of the direction key 16 and the track pad 14, an operation stick or any other operation interface may be provided. Further, the control unit 10 may have a configuration to which a keyboard, a mouse, or any other input device can be connected and may receive an input from the keyboard or the mouse.

As the image display unit, the image display unit 20 worn as spectacles may be replaced with an image display unit worn, for example, as a cap or any other image display unit worn based on another method. Further, the earphones 32 and 34 can be omitted as appropriate.

In the embodiment described above, the head mounted display 100 may guide image light fluxes representing the same image to user's right and left eyes to allow the user to recognize a two-dimensional image or may guide image light fluxes representing images different from each other to user's right and left eyes to allow the user to recognize a three-dimensional image.

In the embodiment described above, part of the configuration achieved by hardware may be replaced with software. Conversely, part of the configuration achieved by software may be replaced with hardware. For example, in the embodiment described above, the image processing portion 160 and the audio processing portion 170 are achieved by the CPU 140 that reads and executes computer programs, and these functional portions may instead be achieved in the form of hardware circuits.

When part or entirety of the functions of the invention is achieved by software, the software (computer program) can be provided in the form of a computer readable recording medium on which the software is stored. In the invention, the "computer readable recording medium" is not limited to a flexible disk, a CD-ROM, or any other portable recording medium and may include a variety of RAMs and ROMs and other internal storage devices in a computer and a hard disk drive and other external storage devices fixed to a computer.

In the embodiment described above, the control unit 10 and the image display unit 20 are separate components as shown in FIGS. 4 and 5, but the control unit 10 and the image display unit 20 are not necessarily configured this way and can be changed in a variety of manners. For example, entirety or part of the components formed in the control unit 10 may be formed in the image display unit 20. Further, the power supply 130 in the embodiment described above may be formed as an exchangeable independent component, and the components formed in the control unit 10 may be redundantly formed in the image display unit 20. For example, the CPU 140 shown in FIG. 5 may be formed in both the control unit 10 and the image display unit 20, and the CPU 140 formed in the control unit 10 and a CPU formed in the image display unit 20 may function differently.

Further, the control unit 10 and the image display unit 20 may be integrated with each other to form a wearable computer that can be attached to user's clothing.

The invention is not limited to the embodiment or the variations described above and can be implemented in a variety of configurations to the extent that they do not depart from the substance of the invention. For example, technical features in the embodiment and the variations that correspond to the technical features in the aspects described in the section of Summary can be exchanged or combined with each other as appropriate in order to achieve part or entirety of the advantageous effects described above. Further, if any of the technical features is not described as an essential part in the present specification, the technical feature can be omitted as appropriate.

The entire disclosure of Japanese Patent Application No. 2013-169737, filed Aug. 19, 2013 is expressly incorporated by reference herein.

What is claimed is:

1. A head mounted display comprising:
an image display having an image light generator that generates image light based on image data and outputs the image light, the image display not only allowing a user who wears the image display around user's head to recognize the image light in the form of a virtual image but also transmitting a surrounding scene;
a luminance processor that identifies luminance at each pixel of the virtual image;
an eye imaging camera that generates images of the user's eyes; and
a controller that (1) determines the uses line-of-sight from the images of the user's eyes, (2) generates an index based on (a) the luminance of each pixel of the virtual image, (b) the user's line-of-sight and (c) illuminance of the transmitted surrounding scene, (3) compares the index with a first threshold set in advance and (4) causes the image light generator to generate display image light that differs from the initial image light in that at least part of the luminance thereof is changed based on a result of the comparison.

2. The head mounted display according to claim 1, further comprising:
an illuminance detector that detects the illuminance of the surrounding scene,
wherein the index is set based on the luminance of the initial image light and the detected illuminance of the surrounding scene.

3. The head mounted display according to claim 1,
wherein the index increases as the luminance of the initial image light increases but decreases as the illuminance of the transmitted surrounding scene increases, and
when the comparison result shows that the index is greater than or equal to the first threshold, the controller causes the image light generator to generate the display image light that differs from the initial image light in that at least part of the luminance thereof is reduced.

4. The head mounted display according to claim 3,
wherein the index changes by a greater amount in accordance with a change in luminance in a position close to the center of a region of the image light generator where the image light is outputted than in accordance with a change in luminance in a position far away from the center of the region, and the display image light is the image light that differs from the initial image light in that the amount of decrease in luminance in the position close to the center of the region is greater than the amount of decrease in luminance in the position far away from the center of the region.

5. The head mounted display according to claim 3,
wherein the camera identifies user's viewing range, the index changes by a greater amount in accordance with a change in luminance in a position close to the center of the identified user's viewing range than in accordance with a change in luminance in a position far away from the center of the viewing range, and the display image light is the image light that differs from the initial image light in that the amount of decrease in luminance in the position close to the center of the viewing range is greater than the amount of decrease in luminance in the position far away from the center of the viewing range.

6. The head mounted display according to claim 1,
wherein the index increases as the luminance of the initial image light increases but decreases as the luminance of the surrounding scene increases, and when the comparison result shows that the index is smaller than the first threshold, the controller causes the image light generator to generate the display image light that differs from the image light in that at least part of the luminance thereof is increased to the extent that the index does not become greater than or equal to the first threshold.

7. The head mounted display according to claim 1, further comprising:

a light controller that adjusts the illuminance of the transmitted surrounding scene with respect to the illuminance of the surrounding scene and transmits the image light, wherein the index increases as the luminance of the initial image light increases but decreases as the illuminance of the surrounding scene increases, and when the comparison result shows that the index is smaller than the first threshold, the controller adjusts the light controller in such a way that at least part of the illuminance of the transmitted surrounding scene decreases to the extent that the index does not become greater than or equal to the first threshold.

8. The head mounted display according to claim 1, further comprising:

a light controller that adjusts the illuminance of the transmitted surrounding scene with respect to the illuminance of the surrounding scene and transmits the image light, the index increases as the luminance of the initial image light increases but decreases as the illuminance of the surrounding scene increases, and when the comparison result shows that the index is smaller than the first threshold, the controller causes the image light to contain information on adjustment of the illuminance of the transmitted surrounding scene made by the light controller as the image light to be recognized by the user.

9. The head mounted display according to claim 1,
wherein the index increases as the luminance of the initial image light increases but decreases as the illuminance of the surrounding scene increases, and when the comparison result shows that the index is greater than or equal to the first threshold, the controller causes the image light to contain information on control of the image light as the image light to be recognized by the user.

10. The head mounted display according to claim 1,
wherein the controller causes the image light generator to generate the display image light based not only on a generation period for which the image light generator generates the image light but also on the index over the generation period.

11. The head mounted display according to claim 10,
wherein the index increases as the luminance of the initial image light increases but decreases as the illuminance of the surrounding scene increases, and when an accumulation of the index for the generation period is greater than or equal to a second threshold set in advance, the controller causes the image light to contain information on control of the image light as the image light to be recognized by the user.

12. A method for controlling a transmissive head mounted display including an image display having an image light generator that generates image light based on image data and outputs the image light, the image display not only allowing a user who wears the image display around user's head to recognize the image light in the form of a virtual image but also transmitting a surrounding scene, the method comprising:

identifying luminance at each pixel of the virtual image;
generating images of the uses eyes;
determining the user's line-of-sight from the images of the user's eyes;
generating an index based on (a) the luminance of each pixel of the virtual image, (b) the user's line-of-sight and (c) illuminance of the transmitted surrounding scene;
comparing the index with a first threshold set in advance; and
causing the image light generator to generate display image light that differs from the initial image light in that at least part of the luminance thereof is changed based on a result of the comparison.

13. The head mounted display according to claim 1,
wherein the index is a logarithm function of the illuminance of the initial image light and the illuminance of the transmitted surrounded scene.

14. The method of claim 12, wherein the index is a logarithm function of the illuminance of the initial image light and the illuminance of the transmitted surrounded scene.

* * * * *